United States Patent [19]
Burgoyne, Jr. et al.

[11] Patent Number: 4,954,144
[45] Date of Patent: Sep. 4, 1990

[54] POLYIMIDE MEMBRANES AND THEIR USE FOR GAS SEPARATION

[75] Inventors: William F. Burgoyne, Jr., Emmaus; Michael Langsam, Allentown, both of Pa.; Robert L. Fowlkes, Milton, Fla.

[73] Assignee: Air Products and Chemicals, Inc., Allentown, Pa.

[21] Appl. No.: 406,225

[22] Filed: Sep. 12, 1989

[51] Int. Cl.$^5$ .................... B01D 53/22; B01D 71/64
[52] U.S. Cl. ............................ 55/16; 55/68; 55/158
[58] Field of Search ...................... 55/16, 68, 158; 210/500, 39

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 X |
| 4,156,597 | 5/1979 | Browall | 55/16 |
| 4,378,400 | 3/1983 | Makino et al. | 428/220 |
| 4,512,893 | 4/1985 | Makino et al. | 55/158 X |
| 4,528,004 | 7/1985 | Makino et al. | 55/158 |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |
| 4,830,640 | 5/1989 | Nakamura et al. | 55/16 X |
| 4,838,900 | 6/1989 | Hayes | 55/16 |

FOREIGN PATENT DOCUMENTS

| | | | |
|---|---|---|---|
| 62-074410 | 4/1987 | Japan | 55/158 |
| 62-074411 | 4/1987 | Japan | 55/158 |

OTHER PUBLICATIONS

T. H. Kim et al., "Reverse Permselectivity" of $N_2$ over $CH_4$ in Aromatic Polyimides, J. Appl. Poly. Sci., vol. 34, 1767–1771 (1987).

M. Salane, "Prediction of Gas Barrier Properties of High Polymers", Poly. Eng. Sci., vol. 26, No. 22, p. 1543 (1986).

Primary Examiner—Robert Spitzer
Attorney, Agent, or Firm—Mark L. Rodgers; William F. Marsh; James C. Simmons

[57] ABSTRACT

The present invention is a class of polyimide membranes wherein the diamine portion of the polymer structure is formed from 2,5-di-t-butyl-1,4-phenylenediamine. Membranes formed from polyimides containing this diamine structure exhibit unexpectedly high gas permeability properties and are especially useful for separating oxygen from nitrogen or air.

6 Claims, No Drawings

POLYIMIDE MEMBRANES AND THEIR USE FOR GAS SEPARATION

TECHNICAL FIELD

The present invention relates to polyimide membranes and their utility in gas separation applications.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

Polyimides, which generally have strong chain-chain interactions and have high Tg values, have been reported to have good gas flux values for certain specific structures. Specifically, U.S. Pat. No. 3,822,202 (1974)., Re 30,351 (1980) discloses a process for separating fluids using a semi-permeable membrane made from polyimides, polyesters or polyamides. The repeating units of the main polymer chain of these membranes are distinguished in that such repeating units have at least one rigid divalent subunit, the two main chain single bonds extending from which are not colinear, is sterically unable to rotate 360 around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on a essentially all of the positions ortho to the amino substituents, and the acid anhydride groups are essentially all attached to rigid aromatic moieties.

U.S. Pat. Nos. 4,717,393 and 4,717,394 teach polymeric membranes and processes using the membranes for separating components of the gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer. It is also taught that such membranes can be photochemically crosslinked, which in some instances results in a better performing membrane.

U.S. Pat. No. 4,378,400 discloses gas separation membranes formed from aromatic polyimides based upon biphenyltetra-carboxylic dianhydride for separating various gas mixtures.

M. Salame in Poly. Eng. Sci., 26 1543 (1986) developed a predictive relationship for oxygen permeability coefficient [$(PO_2)$] and polymer structure. In the publication he demonstrates the group contributions of various structural portions of a polymer to $P(O_2)$ values. In particular he indicates the presence of an aromatic group, such as phenyl, in place of a methylene ($-CH_2-$) decreases the $P(O_2)$ values for a pair of comparative polymers.

SUMMARY OF THE INVENTION

The present invention is a class of polyimide membranes and a process for using said membranes to separate one or more components of a gas mixture. The polyimide membranes of the present invention are distinguishable in that the diamine portion of the polymer structure is formed from 2,5-di-t-butyl-1,4-phenylenediamine. It has been found that by having two t-butyl groups in the ortho positions with hydrogen in the other ortho positions in the diamine structure, simultaneous high molecular weight polymer with good mechanical properties and high free volume can be obtained. Membranes formed from polyimides containing this diamine structures exhibit unexpectedly high gas permeability properties.

The polyimide membranes of the present invention are particularly useful in applications for the separation of oxygen or nitrogen from air.

DETAILED DESCRIPTION OF THE INVENTION

The present invention is a class of polyimide semi-permeable membranes which exhibit unexpectedly high gas permeability properties. The semi-permeable membranes are formed of polyimides which contain a specific disubstituted., i.e. dialkylated, mononuclear diamine. Specifically, it has now been found that, if the membrane is formed of a polyimide having repeating units formed from a dianhydride and 2,5-di-t-butyl-1,4 phenylenediamine, a polymeric membrane structure having both high molecular weight, and hence good mechanical properties, and also high fee volume as determined by "d" spacing measurements, can be formed. The particular polyimide structures containing the above disubstituted mononuclear diamine enable membranes to be formed which exhibit surprisingly high oxygen permeabilities ($PO_2$), even higher than the corresponding tri and tetra substituted diamines.

The specific diamine set out above can be bonded with any suitable dianhydrides which are capable of forming a polyimide with the diamine. For best results, at least 50% of the separating layer of the membrane should be a polyimide formed from a dianhydride and the above diamine. Polyimides which form the membranes of the present invention can have repeating units of the general structural formula:

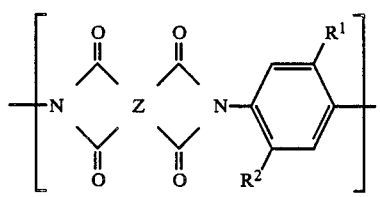

Wherein both $R^1$ and $R^2$ are t-butyl groups and Z is any organic functionality which is capable of forming a stable polyimide, with examples being

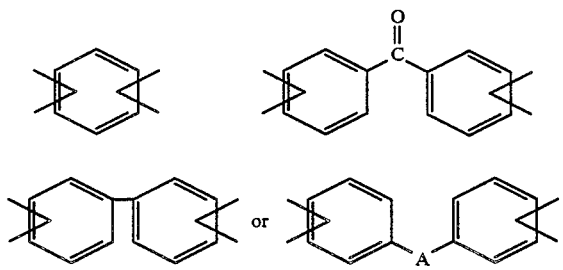

Wherein A is $C(CH_3)_2$ $C(CF_3)_2$, O, S or $SO_2$.

The number of repeating units which form the polyimide is not critical, however the polymer should be of sufficient molecular weight so as to be able to be cast into membrane form. The polyimide membrane can be in the form of a flat sheet, spiral wound sheet or hollow fiber, and optionally may be supported on a permeable support material. The membranes can be used for a wide variety of separations and are particularly well suited for separating oxygen from nitrogen or air. In such a process, a feedstream containing at least two components having different permeability rates through the membrane is brought into contact with the membrane whereby the more permeable component permeates the membrane at a faster rate than the other component, thereby separating the components of the feedstream.

The following examples were carried out and are presented to better illustrate the present invention and are not meant to be limiting.

EXAMPLES 1-5

Preparation of Polyimides by Condensing 6F-Dianhydride with Substituted Phenylenediamines General Procedure:

The following procedures were used to prepare polyimides by condensing 5,5'-[2,2,2-trifluoro-1-(trifluoromethyl)ethylidine] bis-1,3-isobenzofuranedione (6F-dianhydride) with the substituted phenylenediamines indicated in Table 1. Variations in the reaction parameters between the different phenylenediamines reflect the specific conditions required to obtain good, film-forming polyimides.

Polyamic Acid Preparation:

A 20.00 g (0.04502 mol) portion of 6F-dianhydride was added proportionately through the course of 0.5 hr to a solution of 0.04502 mol of the substituted phenylenediamine in anhydrous N,N-dimethylacetamide (DMAC). During the addition, the mixture was stirred mechanically under an inert nitrogen blanket. The initial reaction temperature was 25° C.

The amount of DMAC used was determined by the percent solids concentration indicated in Table 1. Approximately one hour after the addition of dianhydride, the reaction temperature was maintained at 25° C. and the reaction mixture was stirred for the indicated reaction time. This polyamic acid solution was used directly in preparing the corresponding polyimide solution.

Polyimide Preparation:

The solids concentration of the polyamic acid solution was adjusted with DMAC to the values indicated in Table 1. Acetic anhydride (9.18 g, 0.0900 mol) and 2.27 g (0.0225 mol) of triethylamine are added to the polyamic acid solution, and the solution was heated to 60° C. for 3 hr with stirring. After cooling, the polyimide solution was cast on glass plates, and ca. 100 micron thick, polyimide films were obtained after vacuum drying at 70° C./150 mm Hg for 16 hrs then 100° C./0.20 mm Hg for 16 hrs followed by 240° C./0.200 mm Hg. The films were cooled to 25° C. then removed from the vacuum oven. The polyimide films obtained after this drying procedure were determined to contain less than 0.5 wt % residual DMAC as determined by thermal gravimetric analysis (TGA). Of the polyimides formed, the polyimide, Example 5 in Table 1 was formed from 6F-dianhydride and 2,5-di-t-butyl-1,4-phenylenediamine and is a polyimide within the scope of the present invention. The other polyimides formed; i.e. Examples 1-4 in Table 1 are presented for comparative purposes.

TABLE 1
Structures and Analytical Data for Various Polyimides

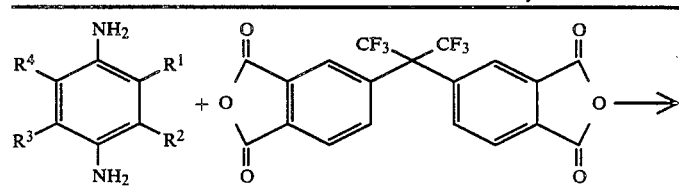

TABLE 1-continued
Structures and Analytical Data for Various Polyimides

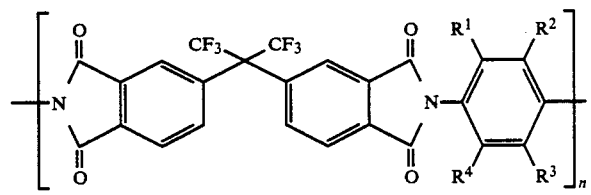

| Example | R$^1$ | R$^2$ | R$^3$ | R$^4$ | Initial Reaction Temp (°C.) | Polyamic Acid Reaction Time (hr) | % Solids Polyamic Acid Solution | % Solids Polyimide Solution | Polyimide Film Tg | Polyimide Film Inh. Visc. |
|---|---|---|---|---|---|---|---|---|---|---|
| 1[a] | H | H | H | H | 25 | 17 | 15 | 15 | >400 | .93 |
| 2[a] | CF$_3$ | H | H | H | 25 | 17 | 40 | 25 | 375 | .81 |
| 3[a] | CH$_3$ | CH$_3$ | CH$_3$ | CH$_3$ | 25 | 17 | 10 | 10 | 329 | 1.00 |
| 4[a] | C(CH$_3$)$_3$ | H | H | H | 25 | 17 | 25 | 20 | 329 | .742 |
| 5 | C(CH$_3$)$_3$ | H | C(CH$_3$)$_3$ | H | 25 | 72 | 40 | 25 | >400 | .598 |

[a] comparative

The oxygen permeability, P(O$_2$) and the oxygen/nitrogen selectivity α(O$_2$/N$_2$) were measured for the five polyimide membranes described in Table 1 above using a CSI-135 gas permeability cell (Customer Scientific Industries; Whippany, N.J.). Additionally, the d-spacing for each membrane was determined by wide angle X-ray scatter technique (WAXS). The results of these measurements, along with the polymer densities and diamine structures from which the polyimides were formed, are set out in Table 2 below.

The results reported in Table 2 above clearly show that the polyimide membrane formed from 2,5-di-t-butyl-1,4-phenylene diamine exhibited significantly higher oxygen permeability, without a large drop in O$_2$/N$_2$ selectivity, compared to the various other polyimide membranes tested, including both the fluorine-containing (polyimide #2) and the tetra-substituted (polyimide #3) polyimide-based membranes.

Having thus described the present invention, what is now deemed appropriate for Letters Patent is set out in the following appended claims.

TABLE 2
Properties and Performance for Various Polyimides

| Example | Aromatic Diamine Segment of Polyimide | P(O$_2$) | α(O$_2$/N$_2$) | "d" Spacing | density |
|---|---|---|---|---|---|
| 1[a] | H$_2$N–C$_6$H$_4$–NH$_2$ (1,4) | 5.4 | 5.51 | 5.66 | 1.47 |
| 2[a] | H$_2$N–C$_6$H$_3$(CF$_3$)–NH$_2$ | 10.5 | 5.5 | 5.66 | 1.38 |
| 3[a] | H$_2$N–C$_6$(CH$_3$)$_4$–NH$_2$ | 136 | 3.13 | 6.30 | 1.18 |
| 4[a] | H$_2$N–C$_6$H$_3$(C(CH$_3$)$_3$)–NH$_2$ | 25.0 | 4.4 | 5.82 | |
| 5 | H$_2$N–C$_6$H$_2$(C(CH$_3$)$_3$)$_2$–NH$_2$ (2,5-di-t-butyl) | 166 | 3.89 | 6.16 | 1.19 |

What is claimed is:

1. A process for separating a component of a gas mixture containing at least one other component, said process comprising bringing said gas mixture into contact with a membrane formed of a polyimide having repeating units formed from a dianhydride and 2,5-di-t-butyl-1,4-phenylene diamine, such that one component of said gas mixture selectively permeates said membrane.

2. A process in accordance with claim 1 wherein said membrane is formed of a polyimide comprising repeating units of the general structural formula:

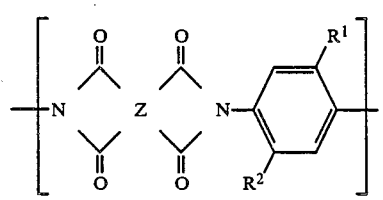

wherein $R^1$ and $R^2$ are both t-butyl groups and Z is

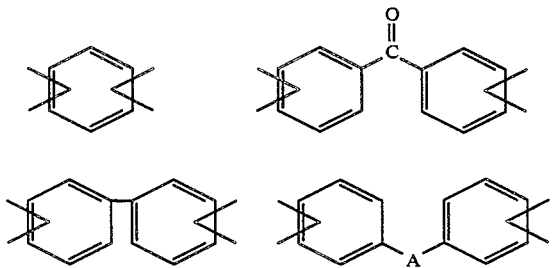

wherein A is $C(CH_3)_2$, $C(CF_3)_2$, O, S or $SO_2$.

3. A process in accordance with claim 1 wherein said gas mixture is air and oxygen selectively permeates the membrane.

4. A semi-permeable membrane formed of a polyimide wherein said polyimide comprises repeating units formed from a dianhydride and 2,5-di-t-butyl-1,4-phenylenediamine.

5. A semi-permeable membrane in accordance with claim 4 wherein said polyimide comprises repeating units of the general structural formula:

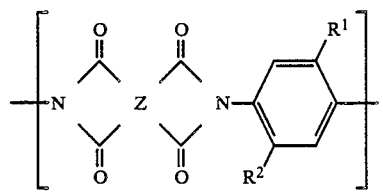

wherein $R^1$ and $R^2$ are both t-butyl groups and Z is

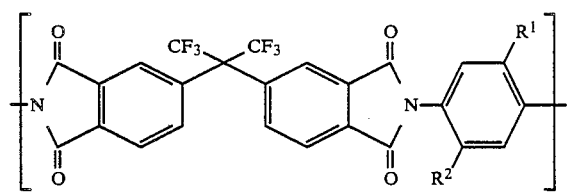

wherein A is $C(CH_3)_2$, $C(CF_3)_2$, O, S or $SO_2$.

6. A semi-permeable membrane in accordance with claim 4 wherein said polyimide comprises repeating units of the formula:

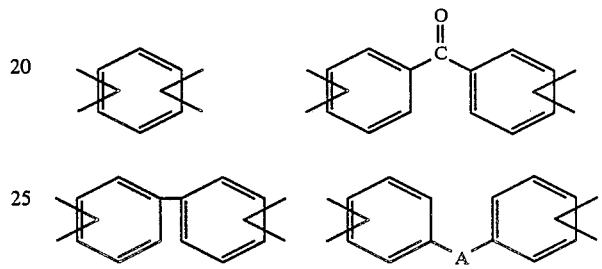

* * * * *